(12) United States Patent
Eilbacher et al.

(10) Patent No.: US 6,724,887 B1
(45) Date of Patent: Apr. 20, 2004

(54) METHOD AND SYSTEM FOR ANALYZING CUSTOMER COMMUNICATIONS WITH A CONTACT CENTER

(75) Inventors: Robert Eilbacher, Port Washington, NY (US); Dan Bodner, Plainview, NY (US); Ted Lubowsky, Huntington, NY (US); Lou Boudreau, Lake Ronkonkoma, NY (US); George Jakobsche, Concord, MA (US)

(73) Assignee: Verint Systems, Inc., Melville, NY (US)

( * ) Notice: Subject to any disclaimer, the term of this patent is extended or adjusted under 35 U.S.C. 154(b) by 0 days.

(21) Appl. No.: 09/490,068

(22) Filed: Jan. 24, 2000

(51) Int. Cl.[7] .............................................. H04M 3/00
(52) U.S. Cl. ........................ 379/265.03; 379/265.02; 379/265.06; 379/266.1
(58) Field of Search ..................... 379/68, 85, 88.09, 379/88.13, 265.02, 265.03, 265.06, 265.07, 265.09, 256.01, 266.1; 704/207, 276

(56) References Cited

U.S. PATENT DOCUMENTS

| | | |
|---|---|---|
| 3,851,121 A | 11/1974 | Marvin |
| 3,855,416 A | 12/1974 | Fuller |
| 3,855,418 A | 12/1974 | Fuller |
| 3,971,034 A | 7/1976 | Bell, Jr. et al. |
| 4,093,821 A | 6/1978 | Williamson |
| 4,377,158 A | 3/1983 | Friedman et al. |
| 4,490,840 A | 12/1984 | Jones |
| 5,148,483 A | 9/1992 | Silverman |
| 5,148,493 A | 9/1992 | Bruney |
| 5,206,903 A | 4/1993 | Kohler et al. |
| 5,535,256 A | 7/1996 | Maloney et al. |
| 5,559,875 A | 9/1996 | Bieselin et al. |
| 5,590,171 A | 12/1996 | Howe et al. |
| 5,594,791 A | 1/1997 | Szlam et al. |
| 5,621,789 A | 4/1997 | McCalmont et al. |

(List continued on next page.)

FOREIGN PATENT DOCUMENTS

| | | |
|---|---|---|
| EP | 0 998 108 A1 | 5/2000 |
| GB | 2 331 201 A | 5/1999 |

OTHER PUBLICATIONS

Search Report dated Jun. 17, 2003 for related application No. GB 0216630.4.
Comverse Infosys, "Ultra 7.0, System Level Requirements (Level C)," Feb. 23, 1999, pp. 1–48.
Comverse Infosys, "Ultra —Detailed Product Description," Apr. 1999, 8 pages.
Comverse Infosys, "Mentor —Detailed Product Description," Apr. 1999, 8 pages.
Comverse Infosys, Ultra —Product Brief, 1999, 2 pages.
Comverse Infosys, Mentor —Product Brief, 1999, 2 pages.

*Primary Examiner*—Bing Bui
(74) *Attorney, Agent, or Firm*—Staas & Halsey LLP

(57) ABSTRACT

A contact center records and analyzes customer communications. The contact center includes a monitoring system which records customer communications and a customer experience analyzing unit which reviews the customer communications. The customer experience analyzing unit identifies at least one parameter of the customer communications and automatically determines whether the identified parameter of the customer communications indicates a negative or unsatisfactory experience. This customer experience analyzing unit can perform a stress analysis on audio telephone calls to determine a stress parameter by processing the audio portions of the telephone calls. It can then be determined whether the customer experience of the caller was satisfactory or unsatisfactory.

22 Claims, 8 Drawing Sheets

U.S. PATENT DOCUMENTS

| | | |
|---|---|---|
| 5,633,916 A | 5/1997 | Goldhagen et al. |
| 5,646,981 A | 7/1997 | Klein |
| 5,696,811 A | 12/1997 | Maloney et al. |
| 5,717,742 A | 2/1998 | Hyde-Thomson |
| 5,721,827 A | 2/1998 | Logan et al. |
| 5,732,216 A | 3/1998 | Logan et al. |
| 5,764,728 A | 6/1998 | Ala et al. |
| 5,768,513 A | 6/1998 | Kuthyar et al. |
| 5,799,063 A | 8/1998 | Krane |
| 5,818,907 A | 10/1998 | Maloney et al. |
| 5,822,306 A | 10/1998 | Catchpole |
| 5,822,410 A | 10/1998 | McCausland et al. |
| 5,822,744 A | 10/1998 | Kesel |
| 5,825,869 A | 10/1998 | Brooks et al. |
| 5,828,730 A | 10/1998 | Zebryk et al. |
| 5,841,966 A | 11/1998 | Irribarren |
| 5,845,290 A | 12/1998 | Yoshii |
| 5,859,898 A | 1/1999 | Checco |
| 5,864,616 A | 1/1999 | Hartmeier |
| 5,870,549 A | 2/1999 | Bobo, II |
| 5,875,436 A | 2/1999 | Kikinis |
| 5,884,032 A | 3/1999 | Bateman et al. |
| 5,884,262 A | 3/1999 | Wise et al. |
| 5,897,616 A | 4/1999 | Kanevsky et al. |
| 5,903,641 A | 5/1999 | Tonisson |
| 5,910,107 A | 6/1999 | Iliff |
| 5,911,776 A | 6/1999 | Guck |
| 5,914,951 A | 6/1999 | Bentley et al. |
| 5,915,001 A | 6/1999 | Uppaluru |
| 5,923,746 A | 7/1999 | Baker |
| 5,940,476 A | 8/1999 | Morgenstein et al. |
| 5,940,494 A | 8/1999 | Rafacz |
| 5,940,792 A | 8/1999 | Hollier |
| 5,943,416 A | 8/1999 | Gisby |
| 5,945,989 A | 8/1999 | Freishtat |
| 5,946,375 A | 8/1999 | Pattison et al. |
| 5,946,388 A | 8/1999 | Walker et al. |
| 6,363,145 B1 * | 3/2002 | Shaffer et al. ......... 379/265.02 |

* cited by examiner

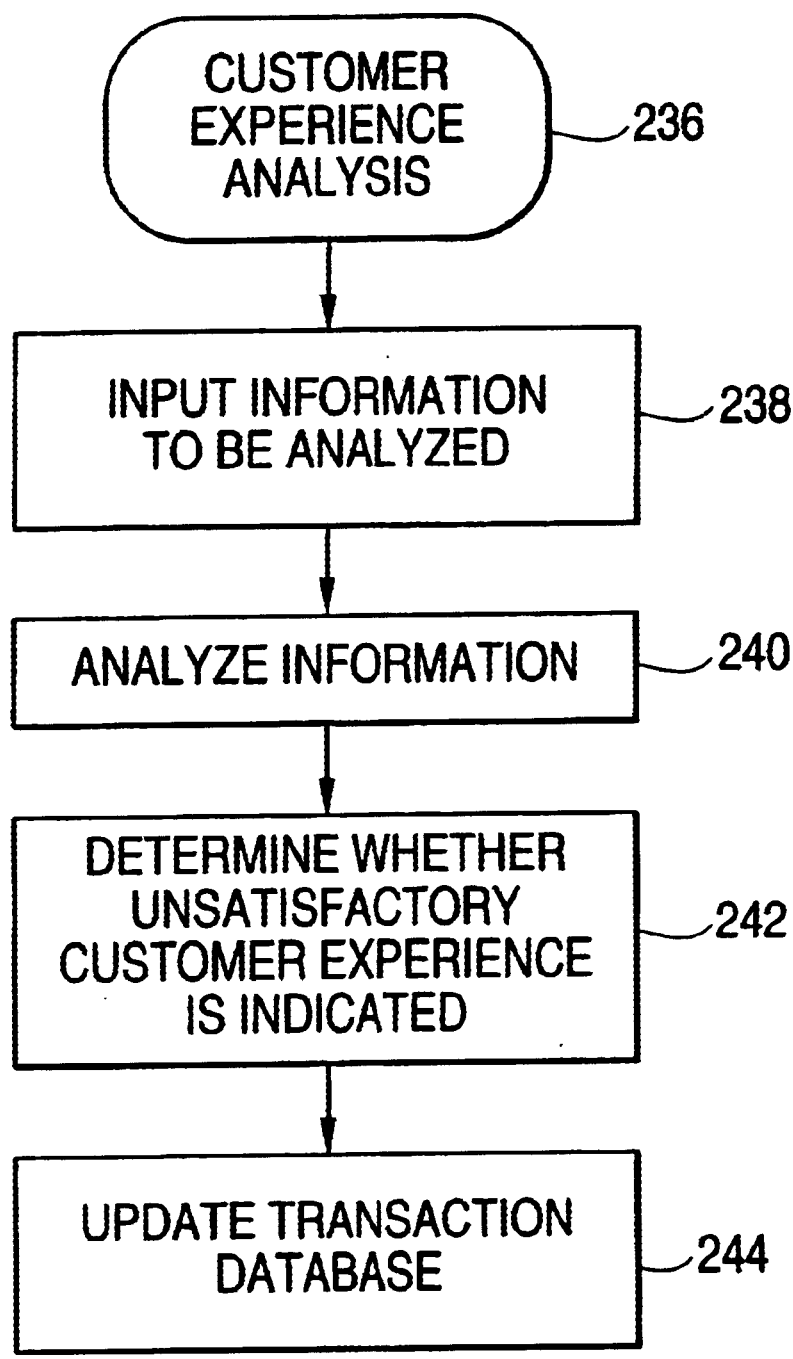

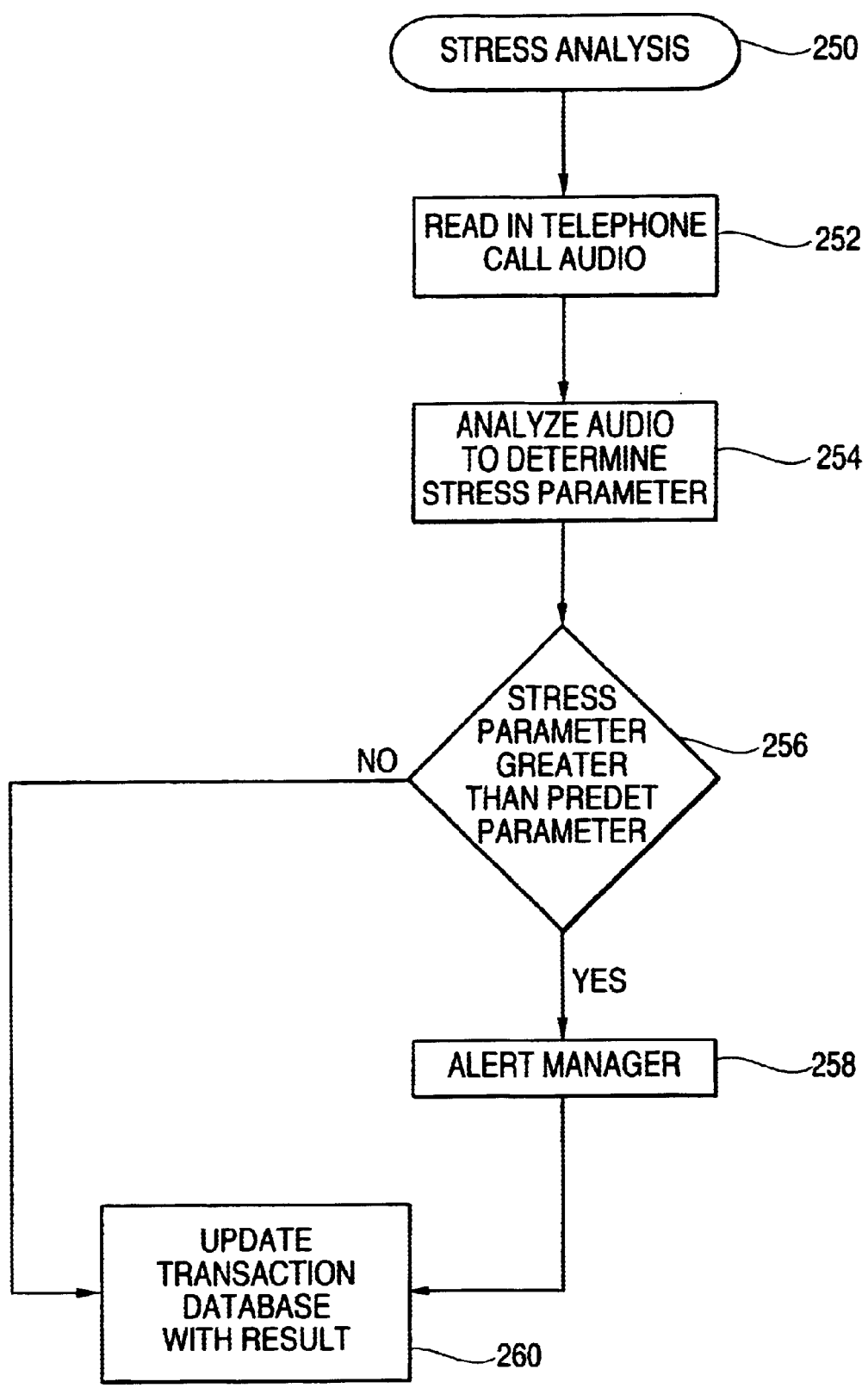

METHOD AND SYSTEM FOR ANALYZING CUSTOMER COMMUNICATIONS WITH A CONTACT CENTER

CROSS-REFERENCE TO RELATED APPLICATIONS

The present invention relates to a concurrently filed application entitled "Open Storage Portal Apparatus And Method To Access Contact Center Information", Ser. No. 09/490,047, filed Jan. 24, 2000 by Robert Eilbacher, et al. the contents of which are hereby incorporated by reference. The present invention also relates to a concurrently filed application entitled "Apparatus and Method for Monitoring and Adapting to Environmental Factors Within Contact Centers", Ser. No. 09,490,065, filed Jan. 24, 2000 by Robert Eilbacher, et al., the contents of which are hereby incorporated by reference.

BACKGROUND OF THE INVENTION

1. Field of the Invention

The present invention relates generally to contact centers for customer communications and more particularly to contact centers which provide a method and system for analyzing a customer's experience in communicating with the contact center.

2. Description of the Related Art

Telephone call centers are facilities for receiving incoming telephone calls and for responding to the calls by taking messages, interactively directing the caller to a preferred service or information provider, or providing advertising or informational messages on behalf of a sponsoring client. For example, a caller dialing into the customer service department of a particular home appliance manufacturer may initially be presented with a recorded voice menu from which the caller may respond by entering the appropriate number on a telephone key pad for the desired department, service, or information. Such menus are included in automated attendant systems to provide multiple options to the caller to accommodate the anticipated needs or inquiries of each caller. The caller could also be queried to provided information, such as the caller's account number or the last name of a sought person. Such systems are known as Interactive Voice Response (hereinafter referred to as "IVR") systems. Both systems generally also offer the caller the option of speaking with a real person, in which case the call is often placed in a queue and answered by the first available agent. Systems for controlling the queuing and routing of such live calls to agents are known as Automatic Call Distribution (hereinafter "ACD") systems. Telephone call centers may be as simple as an alternative answering service for an individual during the hours the person is out of the office, in which case the individual can periodically contact the call center for messages. At the other end of the spectrum are call centers through which the caller can inquire about product information and ultimately order a product, charging the purchase to a credit account, all without ever having to enter a store. Call centers can also provide out-bound services in which the call center agents initiate calls to prospective customers and respond to earlier calls and inquiries. Such telephone call centers are generally described in U.S. Pat. No. 5,825,869 to Brooks et al., which is incorporated herein by reference.

As used herein, the term, "customer," refers to both the individual calling into the call center for information or to access the available services and the individual who is called by the call center. An "agent" is the call center individual responsible for answering the customer's inquiries and directing the customer to the appropriate individual, department, information source, or service as required to satisfy the customer's needs, regardless of whether the customer or the agent initiated the call. A "monitor" or "supervisor" is the individual responsible for listening to the conversation between the customer and the agent, either in real time or after the end of the call while using a recording of the call, to review the agent's performance and to improve the quality of the customer's experience. The monitor may be a call center employee or may be a third party individual responsible for monitoring agent and call center compliance with certain procedures and standards. A "client" is the individual or entity that contracts the call center to receive or initiate telephone calls on behalf of and directed to the individual or entity. For simplicity, call centers are hereinafter described in terms of handling in-bound calls, even though they can also handle out-bound calls.

While large manufacturers, service providers, and information providers have provided in-house call centers to respond to the inquiries of their customers and potential customers, third party telephone call centers have been established whereby calls to several target companies may actually ring and be answered within a third party call center for providing a response, rather than in the locations or offices of the companies themselves. The company the caller is desiring to contact is identified to the call center agent by the telephone number and/or menu response entered by the caller. As such, the call centers may be located thousands of miles away from the actual sought manufacturer or individual.

The monitoring of incoming calls, along with the verbal responses of the call center agents, is a well-known quality monitoring and enhancement practice within telephone call centers. The transactions are reviewed, and the agents being monitored are counseled to improve the quality of the service they provide to the customer. Additionally, some of the conversations are recorded to comply with the requirements certain agencies and businesses face regarding the recording and archiving of transaction information, e.g., stock market trades. This monitoring can occur in real time, while the conversation or telephone contact is occurring, or the verbal data and information entered through the telephone key pads can be logged or stored for subsequent review. Such a system is disclosed in U.S. Pat. No. 5,914,951 to Bentley et al., which is incorporated herein by reference.

Specialized devices have been developed for the full time and selective recording or logging of calls to a call center. Such an apparatus has been manufactured by Comverse Infosys, Inc. of Woodbury, N.Y., under the product name ULTRA. The ULTRA system provides for full time recording of all calls, on-demand and event-driven recording for transaction verification (such as for sales centers), archival of voice data, and instant playback. The ULTRA equipment is installed within the call center, offers a variety of audio compression and archive storage options, and is accessible for audio data retrieval across a local area network (hereinafter referred to as "LAN"). Comverse Infosys, Inc. also markets its MENTOR software package for capturing call center data, including audio data and agent screen data, and for monitoring and scoring call center agents.

Referring now to FIG. 1, there is illustrated an exemplary telephone call center system. Incoming telephone calls from customers 100 are received via the public switched telephone network (PSTN) 101 and processed by the PBX/ACD 102. The IVR portion (not shown) of the PBX/ACD 102 interacts with the customer to determine the nature of the call and the service or information requested by the customer. Although not shown in FIG. 1, the PBX/ACD 102 may include audio databases for directly responding to the customer's inquiries as entered by the customer speaking into his or her telephone or making entries through the telephone keypad. Should the customer indicate a desire to speak with an agent, the PBX/ACD 102 selectively routes the call to available agents operating agent workstations 104. The conversations between the customers 100 and the agents are selectively recorded by a monitor module 106 in a monitoring system 111, and stored in a database 108 together with data corresponding to the agents PC screens (provided via line 105). While all conversations may be recorded in their entirety, typically only a small portion of the calls (e.g., 4–10%) are recorded to save space on the call center database 108; and, of those recorded calls, only a portion of the conversation may subsequently be reviewed. In a rules-based recording system, such as the one displayed in FIG. 1, the recording rules reside in a rules database 110 and control the recording of the conversations by the monitor module 106. Personnel responsible for monitoring the calls may access the information stored on database 108 through their respective supervisor workstations 112 for evaluation of the performance of an agent at one of the workstations 104.

The information gleaned from the telephone call is used by the supervisor or monitor to monitor the performance of the call center agents for identification of any possible training needs. However, the information gathered is limited to the audio conversation between the caller and the agent, any data entered by the caller through the telephone key pad, and the screens viewed by the agent. Additionally, the amount of information available to the monitor is very limited and cannot fully recreate the complete environment experienced by the caller and the agent during the course of the telephone contact. As such, the monitor is restricted in thoroughly evaluating the performance of the agent and in completely understanding the experience of the caller during the telephone contact. Furthermore, telephone call center monitoring and recording are limited to the audio and key pad data exchanged between the customer and agent, notwithstanding the multitude of electronic media that is presently used to effect communication and transactions between customers and businesses.

Furthermore, customer communications with businesses have expanded beyond the simple telephone and now involves a full range of electronic media, such as electronic mail, facsimile, and Internet interaction. Therefore, it has become necessary for telephone call center systems to provide the capability of processing and managing increasing volumes of diverse electronic media and data with which customers and business can remotely interact. The traditional telephone call center will need to evolve into a multimedia contact center. Accordingly, traditional telephone call center systems are not capable of capturing all of the electronic data associated with a multimedia transaction in which the customer utilizes all the media resources available to fulfill a transaction; and, therefore, telephone call center systems are unable to recreate such multimedia transactions for subsequent playback and monitoring.

A key issue in the market place relates to so called customer relationship management ("CRM") and particularly to finding tools for improving customer relationships. Available telephone call centers provide a valuable tool for capturing the customer contact with the system and evaluating the performance of agents in the handling of calls. However, they do not necessarily provide reliable information regarding how the call is perceived by the customer making the call. While available post-call IVR data collection methods can be used to solicit the callers' opinion and add to the database which can be viewed by an evaluator, such "active" methods for evaluating the customer's experience rely too heavily on the cooperation of the customer to provide the data. Further, the customer who is already upset by the way his or her call is being handled, is typically not disposed to respond to an additional set of IVR questions. Therefore, there is not currently available any passive system for automatically evaluating the customer's experience from the customer point of view and without requiring the customer to provide separate input regarding the customer's opinion of his or her experience.

In summary, while available quality monitoring systems provide the capability to offer some insight into how customers view their call center experiences, (thereby allowing the call center manager to effect change when it is clear that these experiences need to be improved), available systems are based on either a supervisor's subjective evaluation of a customer's experience when monitoring the call, or post-call IVR collection of information input by the customer.

SUMMARY OF THE INVENTION

It is an object of the present invention is to provide a method and system for automatically scrutinizing customer experiences with a contact center. Based on the outcome of this analysis, unsatisfactory customer experiences are identified for further investigation by contact center personnel and remedial action may be taken so as to avoid the loss of a customer due to a poor customer experience.

In one aspect, the present invention is directed to a method for analyzing a customer communication with the contact center. The customer communication is reviewed and a parameter of the communication is identified. Then it is automatically determined whether the parameter of the customer communication indicates an unsatisfactory customer experience.

In another aspect of the present invention, a predetermined class of customers is automatically selected and customer communications for the selected class of customers are reviewed. For each of the customer communications, at least one parameter is identified and it is automatically determined whether the identified at least one parameter of each of the customer communications indicates an unsatisfactory customer experience. As a result, the communications of an identified class of customers (for example, highly valued or premier customers) can be automatically analyzed to determined whether this class of customers is having satisfactory or unsatisfactory customer experiences when contacting the contact center.

In another aspect, the present invention is directed to a contact center for recording and analyzing customer communications. The contact center includes a monitoring system for recording customer communications. A customer experience analyzing unit reviews the customer communications, identifies at least one parameter of the customer communications and automatically determines whether the identified parameter of the customer communications indicates an unsatisfactory customer experience.

In still another aspect of the present invention, the customer communication is reviewed to determine the stress level of the communication. Based on this stress level, it is then automatically determined whether the customer communication was unsatisfactory or negative, as viewed from the vantage point of the customer.

Thus, the method and system of the present invention provide a manager with quick insight into the frequency of unsatisfactory customer experiences. For example, if the communication was a telephone call, was it too long, too short, very stressful, interrupted many times, transferred to too many agents, etc. Thus, unsatisfactory customer experiences can be automatically determined and evaluated.

The method and system of the present invention provide significant advantages over the prior art in that they allow a contact center manager to quickly improve the quality of the operation of the contact center by automatically providing an objective indication to the manager of positive and negative experiences of customers in their communications with the contact center. This is because the method and system of the present invention are directed to a passive interpretive device and method, as opposed to an active device and method (such as a set of IVR questions) which ask for direct customer response. Further, a communication which is determined to represent an unsatisfactory or stressful experience for the customer can be tagged, so that a supervisor can take remedial action with respect to the unsatisfactory or stressful call. In addition, the customer account corresponding to the unsatisfactory or stressful call can be tagged so that in future communications the agent handling the contact will be informed that the customer has previously had an unsatisfactory experience. Thus, the method and system of the present invention provide a particularly advantageous tool for customer relationship management (CRM) in that they alert an enterprise of a tenuous customer relationship.

BRIEF DESCRIPTION OF THE DRAWINGS

These and other objects and advantages of the present invention will become more apparent and more readily appreciated from the following description of the preferred embodiments, taken in conjunction with the accompanying drawings.

FIG. 7 is a flow chart for the process performed by the analyzing unit of FIG. 6 to analyze customer communications.

FIG. 8 is a flow chart for the process performed by the analyzing unit of FIG. 6, when the analyzing unit analyzes a stress parameter of an audio telephone call to determine whether a particular telephone call was stressful.

DESCRIPTION OF THE PREFERRED EMBODIMENTS

Figure 2:
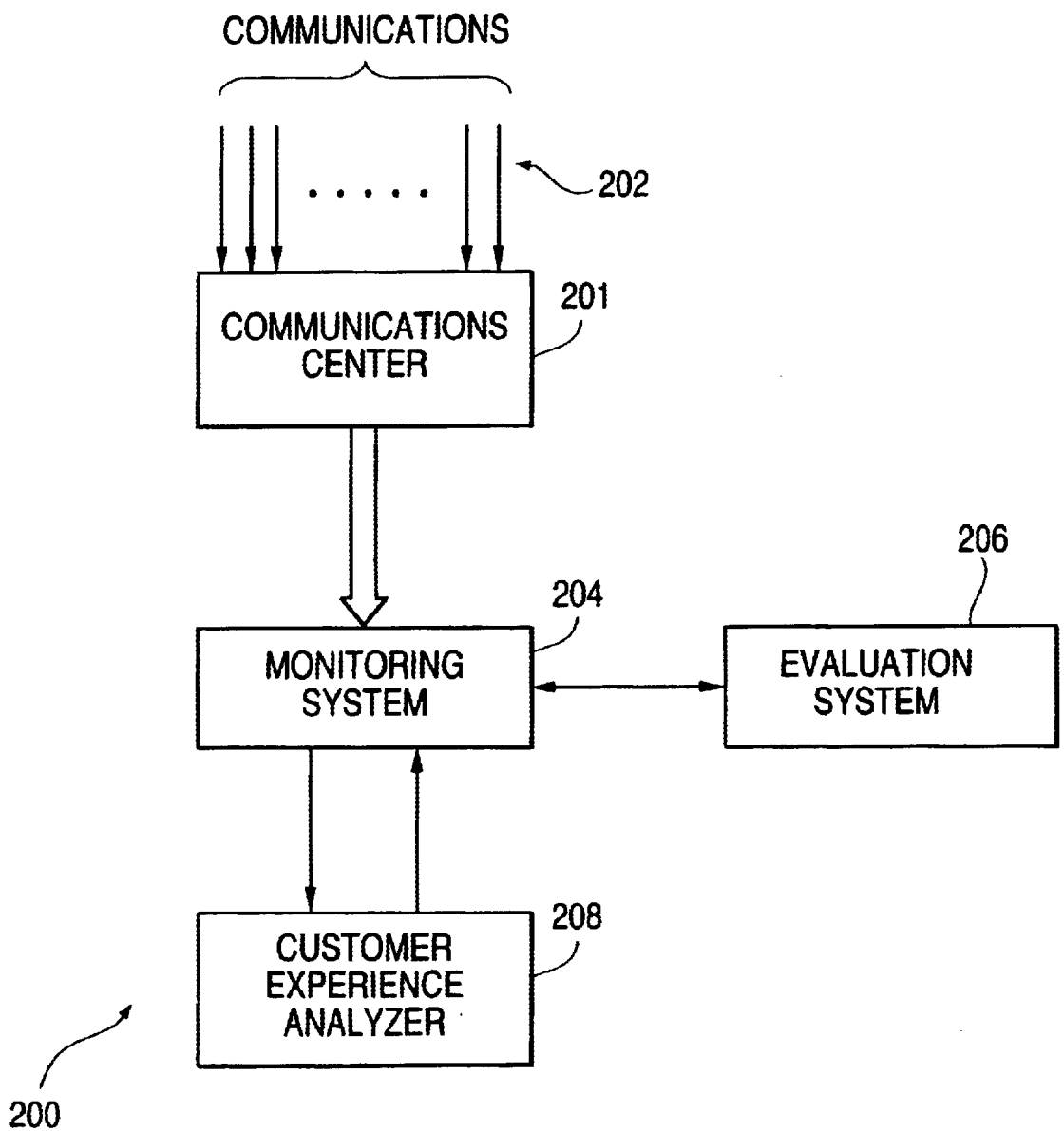
FIG. 2 is a block diagram of an embodiment of a contact center for recording and analyzing customer communications in accordance with the present invention.

Referring to FIG. 2, the contact center 200 in accordance with the present invention includes a communications center 201 for receiving and recording communications 202 from customers. Such communications include, for example, telephone calls, faxes, e-mail, web interaction (such as "chat" sessions), voice over IP and video from a customer. These communications may be provided by any type of telecommunications devices and over any type of medium for carrying data. For example, telephone lines, cable or wireless communications may be used. In addition, other data captured by the communications center can include transaction data, environmental data and other data relating to the call such as length of call, length of time the caller was on hold, number of transfers, number of key strokes entered by the caller, number of menus the customer must traverse during the communication.

As used herein, the term, "contact center," refers to a system which is capable of processing, recording, and analyzing multimedia transactions involving electronic data including voice, graphical user interface screens, video, and electronic mail. While a traditional telephone call center monitors and may record audio data and customer key pad entries, the contact center 200 in accordance with the present invention has the capability of recording the multitude of electronic data formats that represent the interaction that may occur between a customer and a contact center agent during fulfillment of a customer-initiated transaction. Additional information related to the operating environment of the contact center is also captured, time-stamped, and stored. Transactions available to be fulfilled through the contact center 200 include the full range of customer communication activities, from voice and e-mail messaging to information services to online ordering of products. The contact center 200 provides the apparatus and methodology for capturing, accessing, and analyzing all of the data associated with the customer-initiated and customer-authorized transactions. The advantage of recording this data is that the monitor, instead of merely reviewing the conduct of the agent, can now completely recreate the transaction as experienced by the customer and the agent, including wait time, environmental characteristics of the contact center 200 at the time of the call, and calls waiting in the queue at the start of the call.

Figure 1:
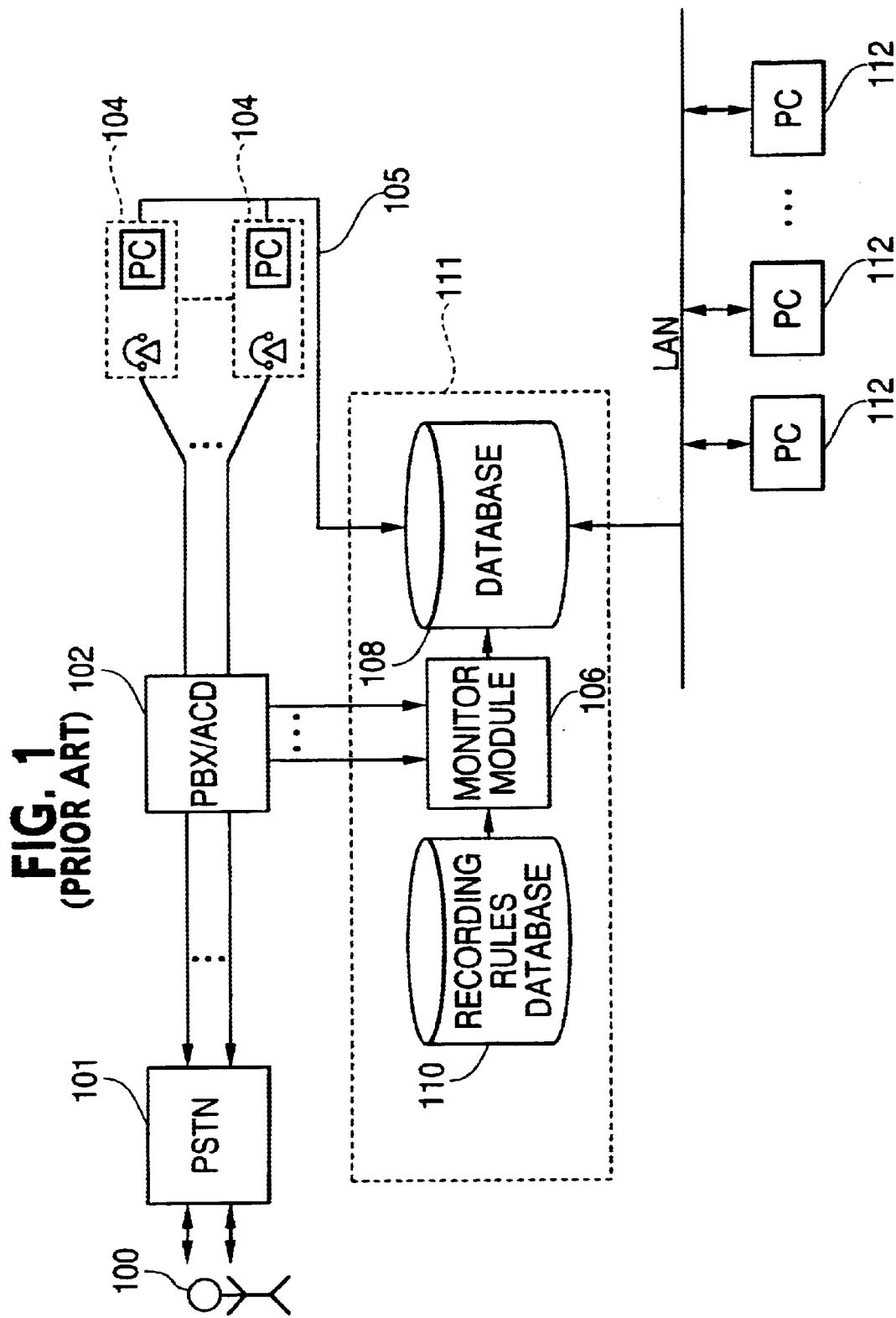
FIG. 1 is a block diagram of a prior art telephone call center.

The communications 202 may be directed to agent workstations within the communications center 201 or remote from the communications center 201. The agents handle or respond to the communications, such as telephone calls, e-mail, fax, video communications and web interactions. For example, the communications center 201 may include the PBX/ACD 102 and agent work stations 104 illustrated in FIG. 1.

A monitoring system 204 is employed in order to record all, or selected ones, of the data related to the communications 202. The monitoring system 204 can then be accessed by an evaluation system 206 which is used, for example, by managers or supervisors in order to evaluate the performance of agents in handling the communications 202 and responding to customers. The evaluation system 206 may include the supervisor stations 112 illustrated in FIG. 1. Alternatively, a remote evaluation system may be used to allow a manager or supervisor to access the communications data over a wide area network (WAN), an intranet or the Internet using a standard personal computer with a browser. This type of remote access is described in detail in copending application Ser. No. 09/490,047 entitled "Open Storage Portal Apparatus and Method to Access Contact Center Information" by Robert Eilbacher, et al.

In accordance with the present invention, the evaluation system 206 is also supplied with customer experience information, described below, which allows the supervisor using the evaluation system 206 to evaluate the quality of the communication from the customer's point of view. Such customer experience information is produced by a customer experience analyzer 208 which receives the recorded communication and/or related data from the monitoring system 204, automatically evaluates the communication and/or related data and produces an output to indicate the quality of the customer experience in connection with the identified communication. For example, it is determined whether the communication was likely perceived by the customer to have been a satisfactory customer experience or an unsatisfactory customer experience. The customer experience analyzer 208 includes a processor and a computer readable storage for performing the above process.

For example, the customer experience analyzer 208 may assign a score or level identifying the customer experience. The output from the customer experience analyzer 208 is then stored in a database in monitoring system 204, so that it may be provided to the evaluation system 206 for use by an evaluator or supervisor. For example, the evaluator or supervisor can use this score or level to select which communication to monitor. During the evaluation process, the evaluator or supervisor presented with a play back of the recorded audio and a display of typical call information (CSR name, time of call, premier account identifier, etc.) together with the output of the customer experience analyzer 208. This output provides the evaluator or supervisor with an objective indication as to how the customer likely perceived the communication being evaluated. This allows the evaluator or supervisor to better evaluate the communication using an on-line evaluation form with consideration given to all of the information provided including the output of the customer experience analyzer 208.

In addition, the customer experience analyzer output can be used to alert a manager or supervisor of an unsatisfactory communication. The evaluation results are stored in the system's evaluation database for analysis used in the reporting tools made available by the quality monitoring system 204.

The customer experience analyzer 208 may be used to analyze any communications of interest, as identified by the monitoring system 204. That is, communications of interest are located by defining search criteria and invoking a search engine provided by the monitoring system 204. Default search mechanisms are provided for finding, for example, high stress communications, communications associated with premier accounts and communications associated with target campaigns. The search is executed against the system's communications information database 214 which maintains all of the data related to each communications. Standard search mechanisms are also made available for generic communications searches based on dates, time, CSR or other desired communications descriptors. High stress communications are those communications detected and tagged during the stress analysis process described below. Premier account communications are communications that have been associated with premier customer accounts. The communications are associated with the defined accounts by one of the communications associated data fields such as the ANI (i.e., the callers telephone number) or a private data field containing an account number, an IVR response or other unique identifier. Similarly, campaign communications are communications that have been associated with campaigns of interest, for example sales of a particular product or service. The communications center 201 includes programs to run campaigns to target specific topics, which then require the ability to evaluate the results and effectiveness of these campaigns. Communications are associated with defined campaigns by one of the communications associated data fields such as DNIS or a private data field containing an IVR response or other unique identifier.

As described above, the evaluation system 206 allows the supervisor or manager to evaluate the quality of the communication from the customer's point of view. From these evaluations, reports may be prepared to provide the ability to quantify customer experiences and levels (e.g., poor, good, excellent), compare experience levels across premier accounts or campaigns, or view a historical perspective of experience levels. While searching for communications, those with stress indicators are highlighted so as to attract attention. A reporting module provides detailed summaries of the trends found in the compiled evaluation data found in the system database 214. The reports are focused on trying to summarize the types and regularity of various customer experiences and the causes of these experiences. Users can access the reporting module from within the evaluation package or through a stand alone package.

Evaluators interact with an evaluation package run by the evaluation system 206 which allows them to search for recorded communications, play them back and evaluate them using online evaluation tools. The evaluation package can be a desk top application or an Internet/intranet browser based application. Data from the evaluations is stored in the database 214.

Figure 3:
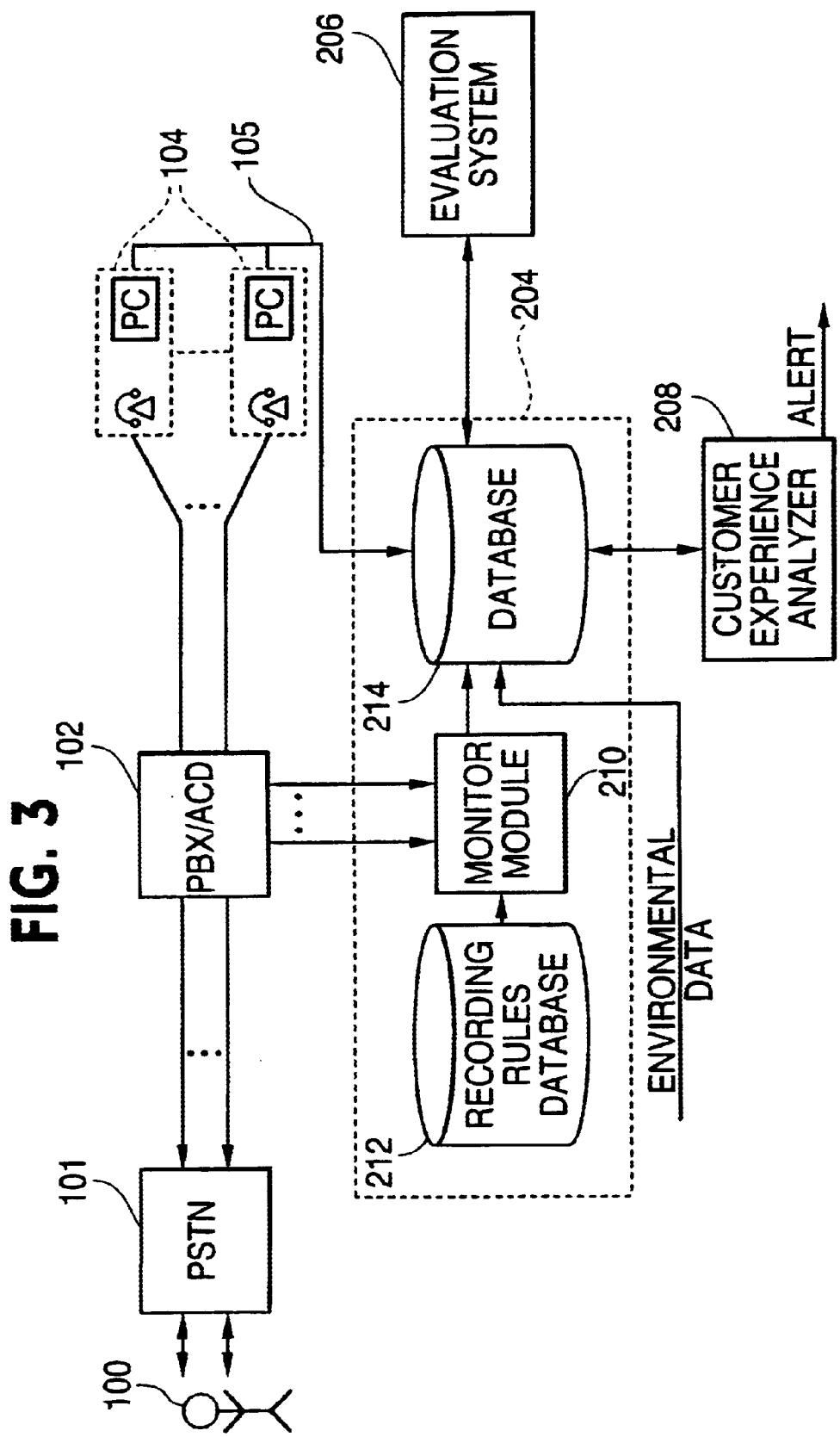
FIG. 3 is a block diagram of an embodiment of a telephone call center for recording and analyzing customer communications in accordance with the present invention.

FIG. 3 is a block diagram of a specific type of the contact center 200 of FIG. 2, and in particular a telephone call center. Referring to FIG. 3, customers 100 access the contact center through the public switched telephone network (PSTN) 101 and an automatic call distribution system 102 (PBX/ACD) directs the communication to one of a plurality of agent work stations 104. Each agent work station 104 includes, for example, a computer and a telephone set. Communications are directed to the agent stations 104 based on the availability of the agent. In those contact centers handling communications for a number of different clients, communications to a particular client may be routed to a finite group of agents specifically trained to respond to the needs of that customer or that client. Alternatively, the PBX/ACD 102 may include an interactive voice response (IVR) system that presents an audio menu to a customer, requesting a response by way of the customer's telephone key pad or by way of a voice response. Then, a call is directed to a particular group of agent stations 104 or to a particular information retrieval system, based on the responses of the customer. For example, the system can provide the customer 100 with the address to which products should be returned or the Internet address for obtaining additional product information. All data associated with the customer's communication and the agents responsive interaction with the customer may be recorded by a monitor module 210 within monitoring system 204. Examples of the data typically recorded by a telephone call center system include the audio communication between the customer and the agent, key pad data input by the customer, screens viewed by the agent on the computer at the agent station 104 (carried by data line 105), the start and end time for the customer's communication, the identity of the customer, including the originating telephone number and the called number, the identity of the various agents servicing the communications, the length of time the customer is on hold and the steps the customer navigated before terminating the communication. The system utilizes automatic number identification (ANI) and dialed number identification service (DNIS) to obtain data on the calling or called party for incoming or outgoing communications, or to identify which telephone number, and therefore which of several campaigns or clients served by the contact center, a customer dialed. This capture of information can include recording analog/digital telephone conversations to capture the verbal part of the transaction and digital recording of the agents' display during and after the conversation with the customer. The recording of the data is controlled at the monitor module 210 by rules maintained in a recording rules database 212.

All incoming and outgoing calls can be recorded in their entirety; particular calls can be identified for recording, such as by client or agent; and calls can be recorded by event, such as calls exceeding five minutes. If "cradle-to-grave" recording is used, then all information related to a particular telephone call or caller-initiated transaction is recorded, from the time the call enters the contact center to the later of: the caller hanging up or the agent completing the transaction. All of the interactions during the call are recorded, including interaction with the IVR system, time spent on hold, data keyed through the caller's key pad, conversations with the agent, and screens displayed by the agent at his/her station 104 during the transaction. These types of recordings allow for evaluation of the full customer experience throughout the transaction. As an example, the length of time a customer was on hold during a purchase transaction can be analyzed as a possible deterrent to completing a purchase. Such information may be used by contact center managers to modify their procedures, staffing, and/or equipment to improve the customer's experience when using the contact center. The comprehensiveness of the data capture of the present invention also allows for the subsequent verification of transaction content. For example, a dispute over what information was verbally provided by a caller applying for insurance coverage over the telephone can easily be resolved by replaying the application call in its entirety. Whether a customer selected size 10 can also be proven, as can whether the customer/investor authorized the purchase of 100 shares of a particular stock.

A unique aspect of the present invention is the storage of other input data into the database 214. This information can include environmental information relating to the contact center, such as the number of calls waiting in queue, the number of active calls, the number of customers on hold, the temperature and humidity at the agents' workstations 104, and the number of idle agents. This data is time-stamped and stored in the database 214 for coordinated subsequent matching with transaction call data being recorded at the same time.

The customer experience analyzer 208 receives data from the database 214 and identifies at least one parameter of the communication. The analyzer 208 compares the identified parameter with a predetermined parameter to determine whether the customer experience in connection with the communication was satisfactory or unsatisfactory (or poor, fair or good).

The reports available in the system provide the ability to quantify customer experience levels (e.g., poor, good, excellent), compare experience levels across premier accounts or campaigns for particular products and to view a historical perspective of experience levels. Reports are created by a user identifying the call sample space to be included in the report. The sample space is located by defining search criteria and then invoking a search engine provided in the monitoring system 204. The search is executed against the system's call information database 214 which maintains all of the data related to each call. Once the calls have been identified the evaluation data for these calls is retrieved from the evaluation database and the required data tabulated to create the report details.

Figure 4:
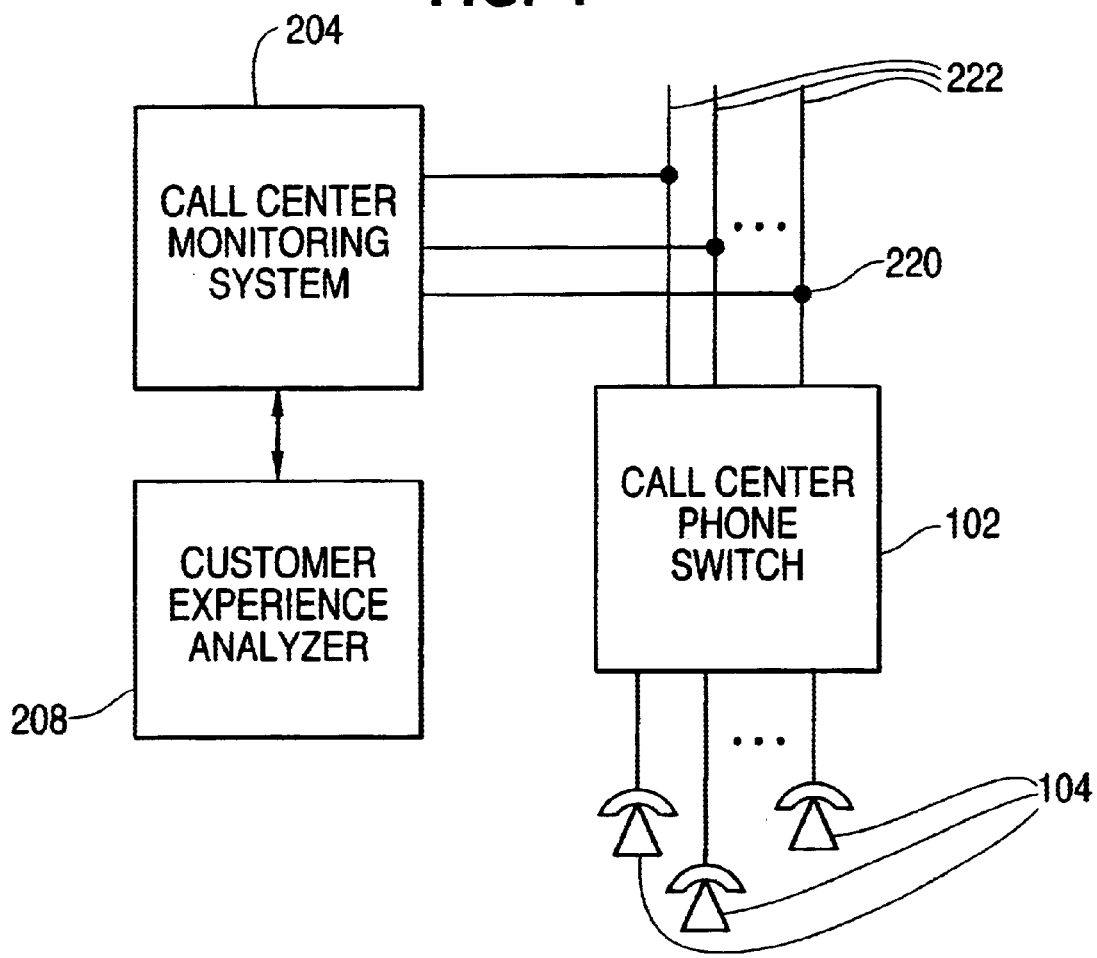
FIG. 4 is a block diagram of a portion of the telephone call center of FIG. 3, illustrating the connection of the telephone call center to PSTN trunks for purposes of "cradle-to-grave" recording of telephone calls.

Referring to FIG. 4, in one aspect of the present invention, the customer experience analyzer 208 is arranged in a telephone call center system which is connected so as to sample "cradle-to-grave" calls which are recorded in the call center monitoring system 204. This cradle-to-grave system refers to the fact that the call is recorded from the time it enters the contact center until the caller hangs up. Such cradle-to-grave recording may take place on the trunk side of the PBX/ACD 102 by placing recording taps 220 on the public telephone service trunk lines 222 which supply the call center. All of the interactions during the call are recorded, including interaction with an IVR system, time spent on hold, number of transfers and conversations with an agent or agents. These types of recordings allow for evaluation of the full customer experience during the interaction. The calls can be recorded randomly or based on a predefined monitoring schedule defined in the monitoring system 204. As the monitoring system 204 records cradle-to-grave call samples, some of the recordings are automatically selected for stress analysis. The selection criteria can be defined by rules for selecting a random M % of calls, selecting every Nth call or select calls marked with specific call information like ANI, DNIS, or any other private call tags provided to the monitoring system 204.

Figure 5:
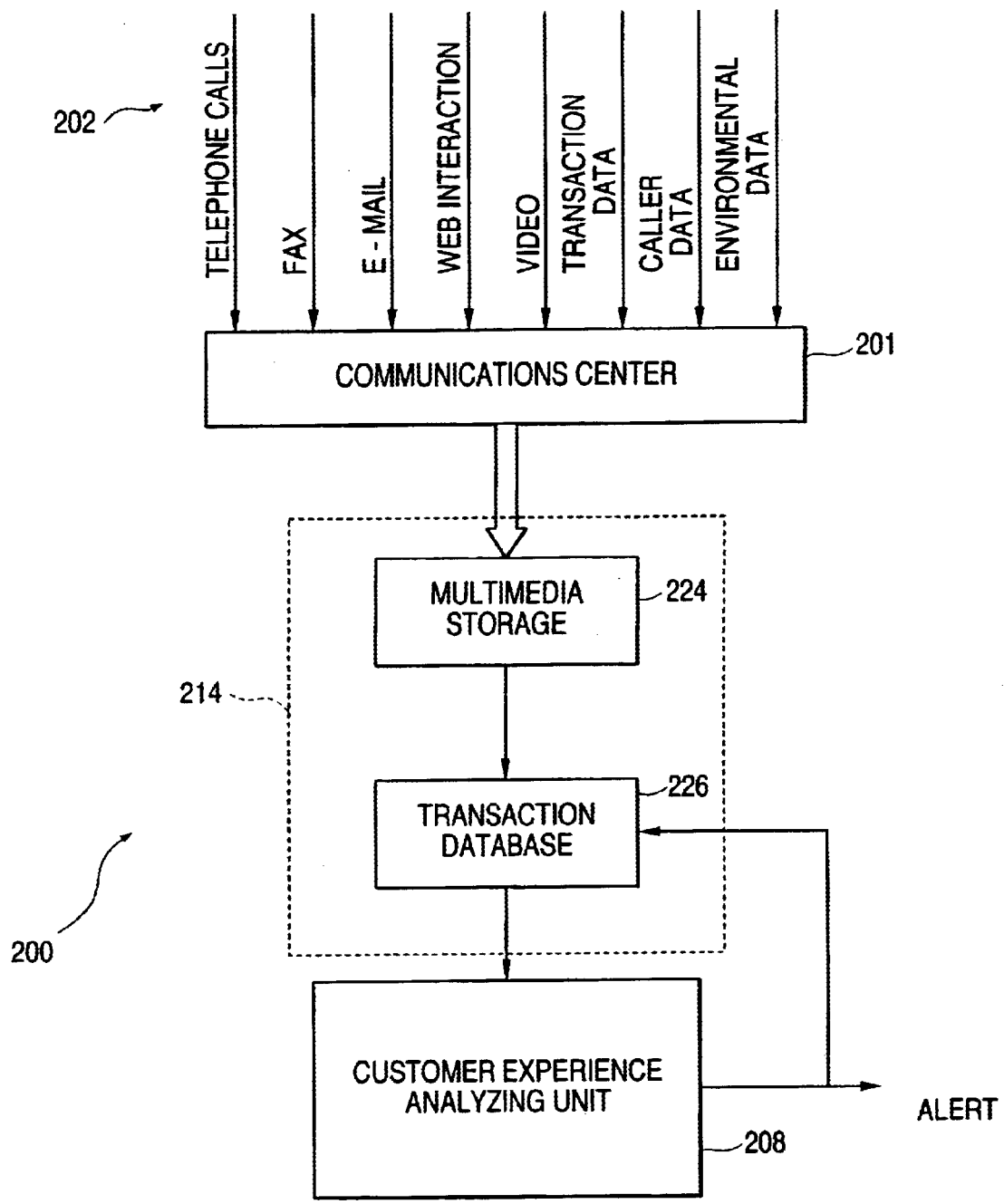
FIG. 5 is a block diagram of an embodiment of the contact center of the present invention, illustrating the various types of communications, and data, and the details of the monitoring system and customer experience analyzer of FIG. 2.

Referring to FIG. 5, the capture of multimedia communication data at the contact center 200 of FIG. 2 is described. Communications 202 and related data associated with the communications to be recorded are captured by the communications center 201 and stored in multimedia storage 224, which stores by data type, on anyone or more well known data storage media, such as disk drives or optical disks which are included in the multimedia storage 224. Pertinent data associated with each communication 202 is also stored within the multimedia storage 224. For example, the date and time of the transaction, customer, agent, contact center identification, and location of the recorded transaction on the multimedia storage 224, are stored. Also stored in a transaction database 226 is the environmental data for the contact center, captured during the time duration of each recorded communication. The data is time stamped so that the various data types can be matched in time for subsequent synchronization and review.

Typically, the monitoring system 204 (FIG. 2) records a sampling of cradle-to-grave communications for evaluation. Information relevant to accessing the communications for evaluation purposes is maintained within the transaction database 226 and analysis of the communications can take place when the system is idle (e.g., overnight). Some of the sample communications are automatically selected for analysis by the customer experience analyzing unit 208 which processes the communication and related data, and selects at least one parameter of the communication for evaluation. This parameter is compared with a corresponding predetermined parameter in order to automatically evaluate the quality of the customer experience in connection with the analyzed communication. The output of the customer experience analyzing unit 208 is provided to the transaction database 226, so that the results of the analysis can be recorded. In addition, under certain conditions, an alert can be provided to a manager or supervisor (for example, when a premier account customer has been determined to have had an unsatisfactory experience). Such an alert allows the manager or supervisor to attempt to remedy the potential problem in customer relations as quickly as possible.

Figure 6:
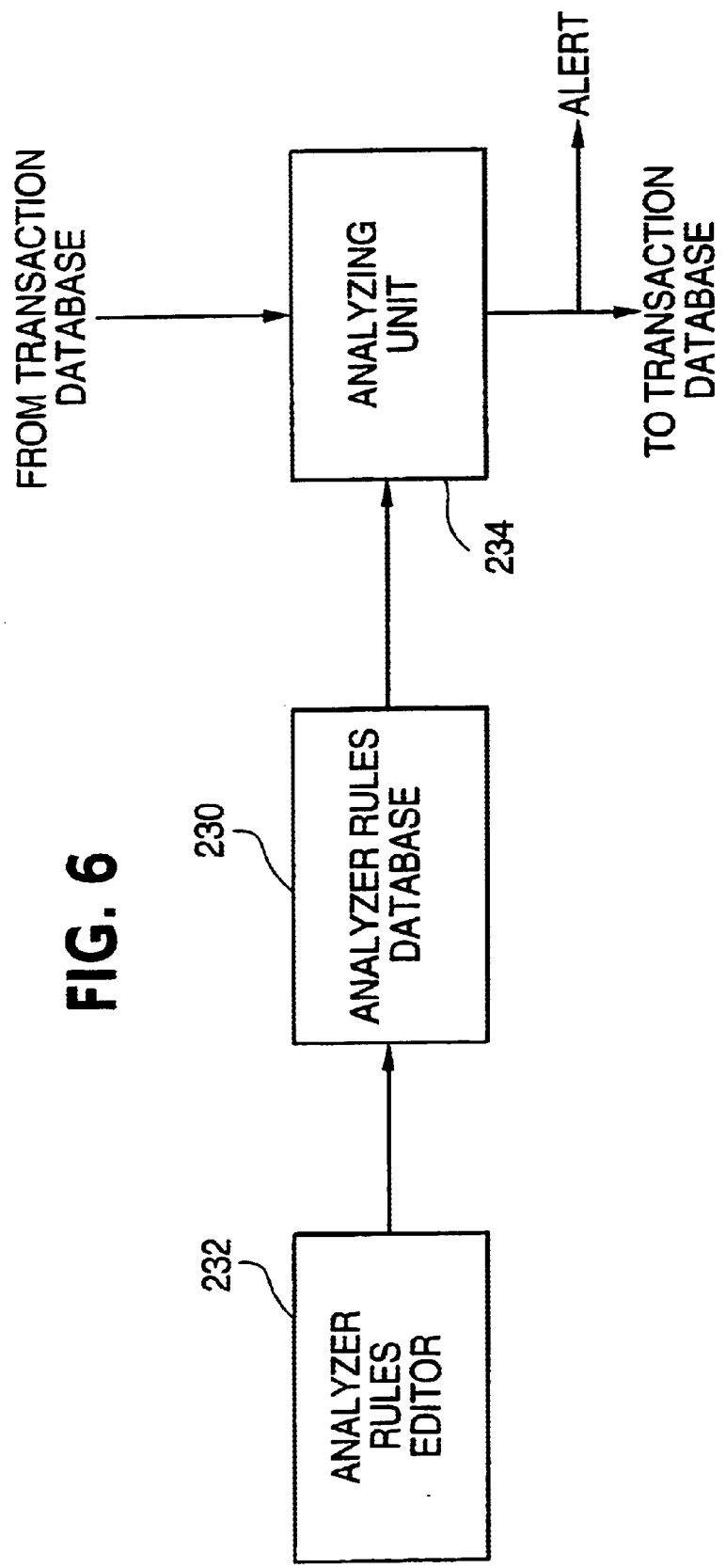
FIG. 6 is a block diagram of the customer experience analyzing unit of FIG. 5.

FIG. 6 is a block diagram illustrating the details of the customer experience analyzing unit 208. An analyzer rules database 230 stores a set of rules which identify when and under what conditions a customer communication is analyzed to determine the customer experience. An analyzer rules editor 232 can be used by a user to modify the rules in the analyzer rules database 230. An analyzing unit 234 includes a processor and computer readable storage, and is used to perform the actual analysis of the communication and related data provided by the transaction database 226 based on the rules stored in the analyzer rules database 230.

An example of an analyzing unit 234 is a voice processing stress analyzer manufactured by Trustech Ltd. The Trustech analyzer includes an algorithm for detecting stress by evaluating audio communications such as a telephone call. The stress analysis process analyzes the audio spectrum to determine if high levels of stress indicators are found in the call. The stress level thresholds can be adjusted to meet the call center's expectations. Calls in which stress are detected are marked as such within the database 214. When a stress level exceeds a predetermined level, then it is determined that the communication was stressful and an output is provided to the transaction database 226 accordingly. As indicated above, this can also trigger an alert to a supervisor or a manager for remedial action.

In addition to the Trustech stress analyzer described above, identification of other parameters of a communication can be used to determine whether a communication is satisfactory or unsatisfactory. The types of parameters which can be analyzed by the customer experience analyzing unit 208 include the number of key strokes entered by the customer during a telephone call, the length of a telephone call, time on hold, number of transfers, or length of a queue. That is, if the length of the telephone call, the number of key strokes entered during the call or the length of a queue exceeded predetermined levels, the customer experience analyzing unit 208 can determine that the communication was likely unsatisfactory. In addition, speech detection or word spotting can be used to detect certain inflammatory words such as curse words. For example, in the case of word spotting, an analysis is performed on recorded audio such as a telephone call. The audio is automatically processed, searching for any key words on a predefined list which have been identified as cause for concern. If any of the words are found, the call is marked as a potentially negative customer experience. This word spotting analysis can be done separately, or in addition to the stress analysis. Similarly, in connection with an e-mail communication, a text search can be used to look for words such as curse words, which might tend to indicate an unsatisfactory customer experience. If such words are located by the analyzer 208, then a determination of an unsatisfactory communication is output to the transaction database 226. Similarly, if the communication is by way of web interaction, parameters of the communications might include the number of screens traversed by the customer during a visit to a web site. If the number of screens traversed is larger than a predetermined number, then the analyzer 208 determines that the communication was likely unsatisfactory. Similar parameters can be analyzed in connection with various other types of communications including facsimile transmissions and voice over IP.

FIG. 7 is flowchart of the process performed by the processor in the analyzing unit 234 of FIG. 6. When a customer experience analysis 236 is to be performed, the information to be analyzed is input at 238. As described above, the information to be analyzed could be a communication such as a telephone call, an e-mail, web interaction, etc. Alternatively, or additionally, the information to be analyzed could be a parameter of the communication such as the length of the call, the number of times the customer was transferred, the number of key strokes input by the customer, the queue length to which the customer was subjected, etc. This information is then analyzed at 240 to identify a parameter or parameters of the communication, such as the stress level or word spotting in an audio telephone call or key word text search results in the case of an e-mail. After the parameter or parameters have been determined, it is determined whether an unsatisfactory customer experience is indicated at 242 by comparing the parameter or parameters with a predetermined parameter or parameters.

For example, in the case of a stress level parameter, if the stress level detected is assigned a value of 7 out of 10, and a predetermined parameter specifies that a communication is stressful if it has a value of anything greater than 5 out of 10, then it is determined based on the results of the analysis that the communication which has been analyzed is a stressful communication.

Similarly, in the case of a text search of an e-mail, if it is determined that the occurrence of more than one key word in an e-mail indicates a stressful communication, and the e-mail being analyzed includes three such key words, then the e-mail is determined to be likely related to an unsatisfactory customer experience.

As another example, if a parameter of a particular call is such that the caller was transferred eight times and the predetermined parameter indicates that when a caller is transferred more than three times, it may present an unsatisfactory customer experience, then it is determined that such a call is likely related to an unsatisfactory customer experience.

In addition to making a determination of whether an unsatisfactory customer experience has occurred based on analysis of individual communication parameters, the determination at 242 can also be made based on combinations of two or more communication parameters. For example, if a telephone call is analyzed, the following parameters may be identified:

(1) The stress level of the call is 7;
(2) The number of transfers during the call is 2;
(3) The length of the call is 10 minutes.

These parameters then can be combined to provide an overall parameter score for the call (for example if a two transfer call is given a stress level parameter of 3 and a ten minute call is given a stress level parameter of 5), then the overall parameter score of the phone call would be 15. This overall score (or the average parameter score, i.e., 5) can then be compared with the predetermined parameter score to determine whether an unsatisfactory customer experience is indicated at 242.

After it is determined whether an unsatisfactory customer experience is indicated, then the transaction database 226 is updated at 204, so that when the particular communication is evaluated using the evaluation system 206, the manager or supervisor will be provided with information indicating whether the communication has been analyzed to be satisfactory or unsatisfactory. Alternatively, different levels of satisfaction can be set with a corresponding series of predetermined parameters.

When the method and system of the present invention determine that an unsatisfactory or negative customer experience has likely occurred, including such a determination by a human, this determination can also be used to build or refine a model or profile of a negative or unsatisfactory customer experience. For example, when the communication is identified as being unsatisfactory, attributes of the communication may be identified and stored. Such attributes include, for example, the gender of the customer or of the agent, the area code or location from which the customer is calling, the type of product or service involved or its monetary value, the agent involved, the time or day of the week of the call, whether the customer is in a premier group, etc. Each communication need not have all the attributes. A count is maintained for each of these attributes. Thus, each time an unsatisfactory customer experience is identified, each of these characteristics or parameters of the communication involved are incremented, so that a model or profile is created. For example, it may be determined that communications at a certain time of the day or with a certain premier group of customers have been negative.

As an alternative approach to creating the model or profile, the identified characteristics or parameters could be incremented when an unsatisfactory customer experience is identified and decremented when it is determined that the customer experience is satisfactory.

Alternatively, these parameters can be stored per communication. That is, for a given communication, the gender of the caller and of the agent, the area code of the caller, the time of day of the call, etc. are stored. For communications that are determined to be either satisfactory or unsatisfactory, a satisfactory/unsatisfactory indication is stored with the parameters. This allows the user or manager to determine if a pattern evolves in connection with unsatisfactory communications, and further allows for development of a profile for such unsatisfactory communications. The stored parameters for a number of unsatisfactory communications can then be analyzed for combinations of parameters, for example female callers, male agents and Friday afternoon calls, that appear frequently. Optionally, the stored parameters for a number of satisfactory communications can be analyzed for combinations of parameters that appear frequently. Thus, combinations of parameters that predict unsatisfactory, or alternatively satisfactory, communications can be identified.

FIG. 8 is a flowchart for the specific process which is performed by the customer experience analyzing unit 208 when it is conducting a stress analysis 250 of an audio telephone call. The telephone call audio is read into the analyzer 234 at 252. Then the audio is analyzed and a stress parameter is determined with respect to the audio at 254. Next it is determined whether the stress parameter determined at 254 is greater than a predetermined parameter at 256. Alternatively, the stress parameter determined at 254 can be compared with a series of predetermined parameters in order to identify which stress level corresponds to the stress parameter determined at 254.

When it is determined that the stress parameter is greater than a predetermined parameter, then an alert is sent to a manger or supervisor at 258. For example, the alert could be in the form of an e-mail sent to a manager, or automatic generation of a report which is subsequently provided to a manager. The e-mail message can contain a pointer to the communication stored in the database 214 to facilitate the manager or supervisor recalling and playing back the communication. Alternatively, all or a portion of the information related to the communication can be copied and attached to the e-mail message. This is particularly useful in attempting to quickly repair customer relations. For example, if the stress analysis is being run on a premier account and it is determined that the premier account owner has likely suffered from an unsatisfactory or stressful experience, then an early alert to a manager will allow the manger to contact the premier account holder quickly, apologize for the unsatisfactory call and determine what can be done to assist the premier account holder.

After it is determined whether the stress parameter is greater than the predetermined parameter 256 then the transaction database 226 is updated at 260. As described above, the updating of the transaction database 226 allows a supervisor or evaluator to review the call together with information indicating that it has been determined that the call was likely an unsatisfactory experience.

Although preferred embodiments of the present invention have been shown and described, it will be appreciated by those skilled in the art that changes may be made to these embodiments without departing from the principal and spirit of the invention, the scope of which is defined by the appended claims and their equivalents.

What is claimed is:

1. A method for analyzing a customer communication with a contact center, comprising:
   reviewing the customer communication and identifying a parameter of the customer communication;
   automatically determining whether the parameter of the customer communication indicates an unsatisfactory customer experience; and
   updating a customer experience profile when it is determined that the parameter of the customer communication indicates an unsatisfactory customer experience, the updated customer experience profile being made available for analysis by a user.

2. The method according to claim 1, further comprising automatically alerting the user when an unsatisfactory customer experience is determined to have occurred.

3. The method according to claim 1, wherein the customer communication is a telephone call and wherein said reviewing comprises performing a stress analysis to determine a stress parameter by processing the audio portion of the telephone call.

4. The method according to claim 3, wherein said automatically determining comprises automatically determining whether the stress parameter of the telephone call is higher than a predetermined stress level.

5. The method according to claim 1, wherein a customer communication is a telephone call and wherein said reviewing comprises performing a word spotting analysis to determine a word parameter based on whether a predetermined word is included in the telephone call.

6. The method according to claim 5, wherein said automatically determining comprises automatically determining whether the word parameter of the telephone call indicates an unsatisfactory customer experience.

7. The method according to claim 1, wherein the customer communication is an e-mail and wherein said reviewing comprises performing a text search of the e-mail to determine a word parameter based on whether a predetermined word is included in the e-mail.

8. The method according to claim 7, wherein said automatically determining comprises automatically determining whether the word parameter of the e-mail indicates an unsatisfactory customer experience.

9. The method according to claim 1, wherein:
   said reviewing comprises reviewing the customer communication and identifying a plurality of parameters of the customer communication, comprising length of call, length of time on hold and, length of time in queue; and
   said automatically determining comprises determining whether any of the plurality of parameters of the customer communication indicates an unsatisfactory experience.

10. The method according to claim 1, wherein:
said reviewing comprises reviewing the customer communication and identifying a plurality of parameters of the customer communication, comprising length of communication, length of time on hold, and length of time in queue; and
said automatically determining comprises determining a composite score for the plurality of parameters and determining whether the composite score indicates an unsatisfactory experience.

11. A method according to claim 1, wherein said updating comprises automatically updating the customer experience profile when it is determined that the parameter of the customer communication indicates an unsatisfactory customer experience.

12. A method for analyzing customer communications with a contact center, comprising:
automatically selecting a predetermined class of customers;
reviewing customer communications for the selected class of customers and identifying at least one parameter for each of the customer communications; and
automatically determining whether the at least one parameter of each of the customer communications indicates an unsatisfactory customer experience.

13. A method according to claim 12, wherein said automatically selecting comprises automatically selecting premier customers.

14. The method according to claim 12, further comprising automatically alerting a user when an unsatisfactory customer experience is determined to have occurred.

15. The method according to claim 13, wherein the customer communications are telephone calls, and wherein said reviewing comprises performing a stress analysis to determine a stress parameter by processing the audio portions of the telephone calls.

16. The method according to claim 15, wherein said automatically determining comprises automatically determining, for each of the telephone calls, whether the stress parameter of the telephone calls is higher than a predetermined stress level.

17. A contact center for recording and analyzing customer communications, comprising:
a monitoring system recording customer communications; and
a customer experience analyzing unit reviewing the customer communications, identifying at least one parameter of the customer communications and automatically determining whether the identified parameter of the customer communications indicates an unsatisfactory customer experience, said monitoring system updating a customer experience profile when it is determined that the identified parameter of the customer communication indicates an unsatisfactory customer experience, the updated customer experience profile being made available for analysis by a user.

18. The contact center according to claim 17, wherein said customer experience analyzing unit automatically alerts the user when an unsatisfactory customer experience is determined to have occurred.

19. The contact center according to claim 17, wherein the customer communications are telephone calls and wherein said customer experience analyzing unit performs a stress analysis to determine a stress parameter by processing the audio portions of the telephone calls.

20. The contact center according to claim 19, wherein said customer experience analyzing unit automatically determines, for each of the telephone calls, whether the stress parameter of the telephone call is higher than a predetermined stress level.

21. A contact center for recording and analyzing customer communications, comprising:
means for recording customer communications; and
means for reviewing the customer communications, for identifying at least one parameter of the customer communications and for automatically determining whether the identified parameter of the customer communications indicates an unsatisfactory customer experience, said means for recording including means for updating a customer experience profile when it is determined that the parameter of the customer communication indicates an unsatisfactory customer experience, the updated customer experience profile being made available for analysis by a user.

22. A computer readable storage controlling a computer and comprising a process of reviewing a customer communication with a contact center, identifying a parameter of the customer communication, determining whether the parameter of the customer communication indicates an unsatisfactory customer experience, and updating a customer experience profile when it is determined that the parameter of the customer communication indicates an unsatisfactory customer experience, the updated customer experience profile being made available for analysis by a user.

* * * * *